Sperry & Sherwood,
Enameling Machine,
No 1,609. Reissued Jan. 26, 1864.
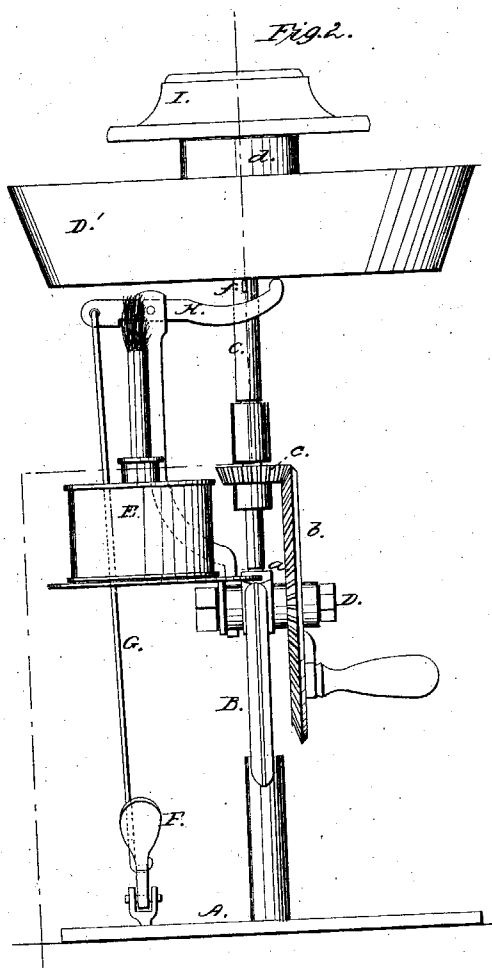
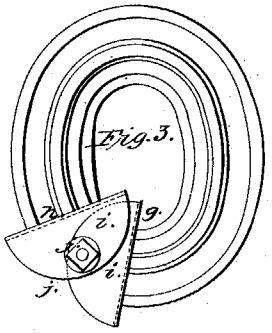
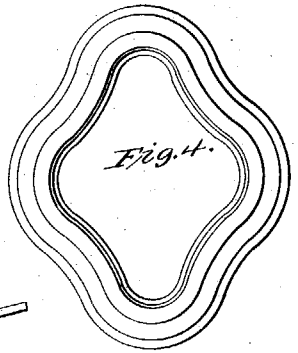
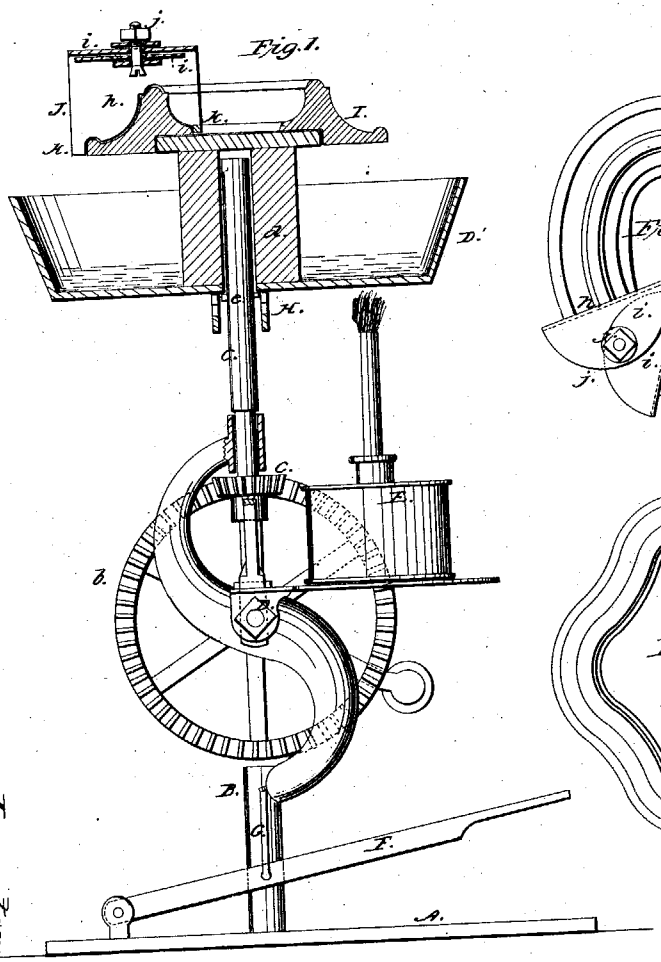
Witnesses:
[illegible]
C. W. Curtiss
Inventor:
John Sperry
C. R. Sherwood.
AM. PHOTO-LITHO. CO. N.Y. (OSBORNE'S PROCESS)

UNITED STATES PATENT OFFICE.

O. L. GARDNER, OF NEW YORK, N. Y., ASSIGNEE OF JOHN SPERRY AND C. W. SHERWOOD, OF SAME PLACE.

IMPROVEMENT IN MACHINES FOR ENAMELING PICTURE-FRAMES.

Specification forming part of Letters Patent No. 31,913, dated April 2, 1861; Reissue No. 1,609, dated January 26, 1864.

*To all whom it may concern:*

Be it known that JOHN SPERRY and C. W. SHERWOOD, of the city, county, and State of New York, did obtain Letters Patent for a new and improved machine for enameling oval and other shaped frames preparatory to gilding the same, said Letters Patent bearing date April 2, 1861; and be it known that I, O. L. GARDNER, also of the city, county, and State of New York, have, by virtue of assignments duly recorded in the Patent Office, become vested in all the right, title, and interest in the Letters Patent aforesaid; and, for the purpose of obtaining a reissue of the same, do hereby declare that the following is a full, clear, and exact description of the invention pertaining thereto, reference being had to the accompanying drawings, making a part of this specification, in which—

Figure 1 is a sectional elevation of the invention, taken in the line *x x*, Fig. 2; Fig. 2, an elevation of the same; Fig. 3, a top view of the scraper applied to an oval frame; Fig. 4, a view of a diamond-shaped frame with curved corners.

Similar letters of reference indicate corresponding parts in the several figures.

The object of this invention is to obtain a machine which will greatly aid and expedite the manual process of enameling frames—such as picture and mirror frames—preparatory to gilding them, and one which may be used for enameling circular, oval, and all other shaped frames excepting those containing angles.

To enable those skilled in the art to fully understand and construct the invention, I will proceed to describe it.

A represents a base or platform on which an upright frame, B, is placed, and C is a vertical shaft which has its bearings in the frame B, and is stepped at *a*, as shown in Fig. 2. The shaft C is rotated by gearing *b c* from a driving-shaft, D, and on the upper part of the shaft C there is placed a basin or receiver, D′.

The basin or receiver D′ is fitted loosely on its shaft C, the basin having a hub, *d*, secured within it centrally, and into which the upper part of shaft C passes, the basin or receiver resting on a pin, *e*, which passes through the shaft C. To the under side of the basin or receiver D′ there is attached a vertical pin, *f*, against which the pin *e′* of shaft C bears and causes the basin or receiver D′ to rotate with the shaft.

E is a lamp, which is placed on a stand attached to frame B at a suitable distance below the basin or receiver D′; and F is a treadle, which is attached to the base or platform A, and is connected by a rod, G, with a lever, H, attached to the frame B. This lever is forked at its inner end, and extends underneath the basin or receiver to about its center, as shown in Fig. 2.

I represents a frame to be enameled. This frame is secured horizontally on the top of the hub *d*, and within the basin or receiver the substance is placed with which the frame is enameled—to wit: whiting and size.

J represents a scraper, which is formed of two vertical metal plates, *g h*, having each a horizontal flange, *i*, at their upper ends. These flanges overlap each other and are connected together by a bolt, *j*, on which they are allowed to work freely. The plate *g* has its lower edge cut or formed so as to correspond with a profile of a transverse section of the face of the frame, as shown clearly in Fig. 1. The other plate, *h*, may be constructed in the same way, if desired, but it is not essential, as the latter plate merely serves as a guide, and it may have the ends *k k* only to serve as bearings. (See Fig. 1.)

The operation is as follows: The basin or receiver D′ is supplied with a requisite quantity of whiting and size, and the lamp E is lighted and placed in proper place on its stand. The frame I is secured on the hub *d*, and the shaft D rotated by any convenient power. The operator, by means of a suitable brush, applies the whiting to the frame I, which is soon evenly covered on account of its rotation, and the rotation of the basin or receiver D′ prevents the whiting directly over the lamp becoming stiff or hard, as would be the case were it kept stationary over the lamp. This arrangement admits of the water-receptacle being dispensed with, a device hitherto necessary in order to insure the even or uniform heating of the whiting, the basin or receptacle of the latter being fitted in a water-receptacle, similar to an ordinary glue-pot.

When the whiting is applied to the frame

I, the operator or attendant applies the scraper J to the face of the frame and holds the same thereto by hand while the frame rotates. The plate *h* of the scraper, which is the foremost one, serves, as before stated, as a guide, and prevents the plate *g* from being thrown out of a proper position with the frame, so that said plate *g* cannot bind on the frame, a contingency which would occur if the plate *g* were thrown out materially from a position at right angles with the face of the frame, or, in other words, out from a line radial with shaft C. By having the two plates *g h* connected by the bolt *i* they are allowed to move or adjust themselves more or less angularly or obliquely with each other to correspond to the form of the frame.

The operator holds the scraper J so as to allow it to move freely under the rotation of the frame, and it will therefore be seen that any frame of a curved form, (see Fig. 4, for instance,) or a curved and straight form combined, and having no angles, may be enameled by our machine. The scraper J performs, of course, the same function as that of other machines, taking off the superfluous whiting and smoothing that left on the frame. The basin or receiver, by being placed on the shaft C and in the relation of frame I, as shown and described, admits of the whiting being readily applied to the frame, and without any spilling and waste of the same; and at any time when it is desired to stop the rotation of the basin and frame without stopping the shaft C, which is done in putting on and taking off the frames from the hub *d*, the operator raises the basin D′ so that its pin *f* will be above the pin *e* of shaft C by depressing lever F with his foot.

The machine, it will be seen, is extremely simple and efficient, and it is believed admits of a more general adaptation to different kinds of work than any hitherto devised for the purpose.

Having thus described the invention, what I claim as new, and desire to secure by Letters Patent, is—

1. The employment, for the purpose specified, of a basin or enamel-receiver, D′, either fixed or stationary, used in connection with a rotating shaft, C, or an equivalent means for rotating the frame I, to be enameled, and either with or without a lamp, E, or other heating medium, substantially as described.

2. The scraper J, formed of two plates, *g h*, connected together by a bolt, *j*, and arranged to operate as and for the purpose herein set forth.

3. The lever H, in combination with the pin *e* of shaft C and the pin *f* of the sliding or adjustable basin or receiver D′, or other suitable clutch, arranged to operate substantially as and for the purpose specified.

O. L. GARDNER.

Witnesses:
D. ROBERTSON,
THOS. S. J. DOUGLAS.